INVENTORS
MARVIN H. GLAUBERMAN
ROBERT C. KELNER
BY Joseph Weingarten
ATTORNEY

INVENTOR
MARVIN H. GLAUBERMAN
ROBERT C. KELNER
BY Joseph Weingarten
ATTORNEY

*INVENTORS*
MARVIN H. GLAUBERMAN
ROBERT C. KELNER
BY Joseph Weingarten
*ATTORNEY*

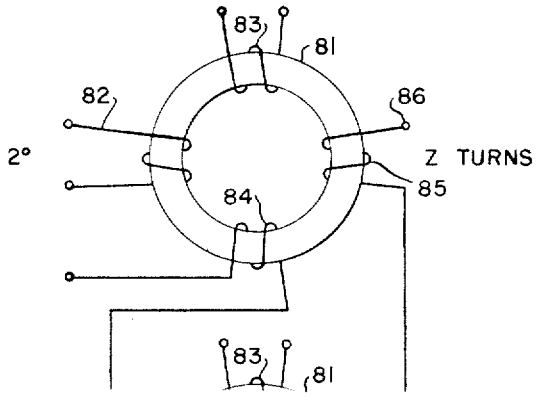
83
81
82
86
2°
Z TURNS
85
84
83
81

United States Patent Office

Re. 26,104
Reissued Nov. 1, 1966

26,104

DATA PROCESSING APPARATUS FOR IDENTIFYING AN UNKNOWN SIGNAL BY COMPARISON

Marvin H. Glauberman, St. Davids, Pa., and Robert C. Kelner, Concord, Mass., assignors to Laboratory for Electronics, Inc., Boston, Mass., a corporation of Delaware Original No. 2,947,971, dated Aug. 2, 1960, Ser. No. 553,770, Dec. 19, 1955. Application for reissue June 14, 1963, Ser. No. 288,061
15 Claims. (Cl. 340—146.2)

Matter enclosed in heavy brackets [ ] appears in the original patent but forms no part of this reissue specification; matter printed in italics indicates the additions made by reissue.

This invention relates in general to signal detection apparatus and in particular to a system which identifies an unknown signal waveform by comparing portions thereof with corresponding portions of a plurality of permanently stored known signal waveforms; the known waveform which most nearly matches said unknown waveform being recognized as said unknown signal waveform.

While devices which indicate that a signal amplitude or frequency is greater or less than a predetermined value are well-known in the prior art, apparatus for identifying a complex signal waveform, such as derived from unidirectionally scanning a printed symbol, has heretofore been relatively complex and slow in indicating recognition. Consequently, it is a primary object of the present invention to provide relatively simple apparatus for rapidly deriving an output signal which identifies an unknown, relatively complex, signal waveform.

Another object of the invention is to provide means for classifying an unknown signal waveform by comparing portions thereof with corresponding portions of a plurality of known signal waveforms and identifying the unknown as that one of the known signals which the comparison indicates most nearly resembles the unknown waveform.

A further object of the invention is to characterize portions of the unknown signal waveforms by binary numbers, compare the binary numbers associated with the unknown and known signal waveforms and provide the result of the comparison in analog form; that is, the comparison signal has a characteristic which is indicative of the degree of difference between the compared waveforms.

An object is to provide apparatus for providing an output signal characteristic of the definite integral of an aperiodic function.

Still a further object is to provide apparatus of the kind described which utilizes a novel magnetic core digital-to-analog converter, thereby incorporating a high degree of accuracy and reliability into the apparatus.

Still another object of the invention is to provide apparatus readily adaptable for the conventional unnormalized auto-correlation and/or cross-correlation of functions in a system which utilizes a magnetic core digital-to-analog converter.

Still another object is to provide simple instrumentation of a novel normalized correlation function.

Another object is to provide the aforesaid correlation functions in a time interval of markedly less duration than hitherto attainable.

An object of the invention is to provide means for recognizing a printed character by scanning said character to derive an electrical signal having a waveform characteristic of said character and comparing the signal so derived with a plurality of known signal waveforms, each related to a known character, the derived signal waveform being recognized as corresponding to one of the known signal waveforms in accordance with the foregoing objects, thereby providing recognition of the character scanned.

A further object is to provide means for processing signal waveforms according to one or more of the foregoing objects with apparatus that is relatively insensitive to the rate at which signal waveforms are introduced for processing.

In a broad form the invention includes a method of deriving a signal characteristic of the degree of match between two functions by generating the following integral function $$\int_0^T \left| \frac{f_1(t_1)}{f_2(t_1)} - \frac{\int_0^T f_1(t)\,dt}{\int_0^T f_2(t)\,dt} \right| |dt_1|$$

where t is the independent variable, $f_1(t)$ and $f_2(t)$ are the two functions being compared, $t_1$ is a dummy variable and indicates that the ratio $$f_1(t_1)/f_2(t_1)$$

is evaluated at corresponding values of t for both $f_1$ and $f_2$, and T is the interval over which the integral function is evaluated.

In one aspect, this invention comprises apparatus which interprets signal waveforms in accordance with the following recognition function, which is the above integral function, expressed in quantized form, $$\sum_{i=1}^{n} \left| \frac{mx_i}{r_i} - \sum_{i=1}^{n} \frac{x_i}{n} \right|$$

by sampling the unknown waveform in discrete regions thereof and deriving therefrom for each sampled region a binary number related to a selected characteristic thereat. In the above equation $x_i$ represents the selected characteristic of the unknown waveform at the $i^{th}$ one of the n sampled regions, m is the average value of the selected characteristic of the known signal waveform, and $r_i$ is indicative of the selected characteristic at a corresponding portion of a known waveform compared therewith. The aforementioned characteristic may be signal amplitude, phase, frequency, zero crossovers, pulse width, or any other selected characteristic capable of being compared. It is to be understood that the method disclosed herein is applicable when the selected characteristic is not binarily encoded.

It is convenient to rewrite the recognition function as:

$$\sum_{i=1}^{n} \left| \frac{x_{ij}}{r_{il}} - \sum_{i=1}^{n} \frac{x_{ij}}{k_l} \right|$$

where $k_l = mn$ and corresponds to the sum of the sampled selected characteristics of the known waveform, $x_{ij}$ is the $i'^{th}$ selected characteristic of the $j'^{th}$ unknown waveform, $r_{il}$ is the $i'^{th}$ selected characteristic of the $l'^{th}$ known waveform, and n is the number of samples. Generation of the foregoing function admits of relatively simple instrumentation, including as fundamental operations, multiplication by a constant, addition (algebraically), and full-wave rectification.

In one form the invention is embodied to include means for sampling the amplitude of the unknown signal waveform at a plurality of discrete time points. A binary number signal is derived for each sampled point and inserted into storage in a magnetic core storage system. When all the binary numbers derived from sampling the waveform are arranged in the magnetic storage system, an interrogation pulse is applied to one input of a gate which simultaneously is energized by a pulse from said storage system which is characteristic of the degree of match between the unknown and known waveforms, there being a gate for each expected known waveform, each gate providing an output matching pulse for each expected waveform. Thus, the unknown signal waveform is compared with known signal waveforms. Since the amplitude of each output matching pulse is characteristic of the degree of match between a known and the unknown signal waveforms, the known signal waveform associated with the smallest output pulse is recognized as the unknown signal waveform.

A feature incorporated in the preferred embodiment is a digital-to-analog converter which employs magnetic cores arranged in a novel manner. For each binary digit place there is a magnetic core. A core stage includes adjacent cores which have serially-connected output windings each respectively associated with binary digits of adjacent significance. The converter output pulse, which has an amplitude characteristic of the binary number stored in the cores, is generated across the serially-connected windings. Digital-to-analog conversion is obtained by maintaining the ratio of the number of turns of one serially-connected winding to another at substantially $2^{(m-n)}$, where m and n are integers related to the significance of binary digit places respectively corresponding to the cores involved in the foregoing turns-ratio comparison and $m>n$.

These and other objects and advantages will become apparent from the following specification read with reference to the accompanying drawings in which:

FIG. 6 is a schematic circuit diagram of a typical core stage utilized for digital-to-analog conversion.

Figure 1:
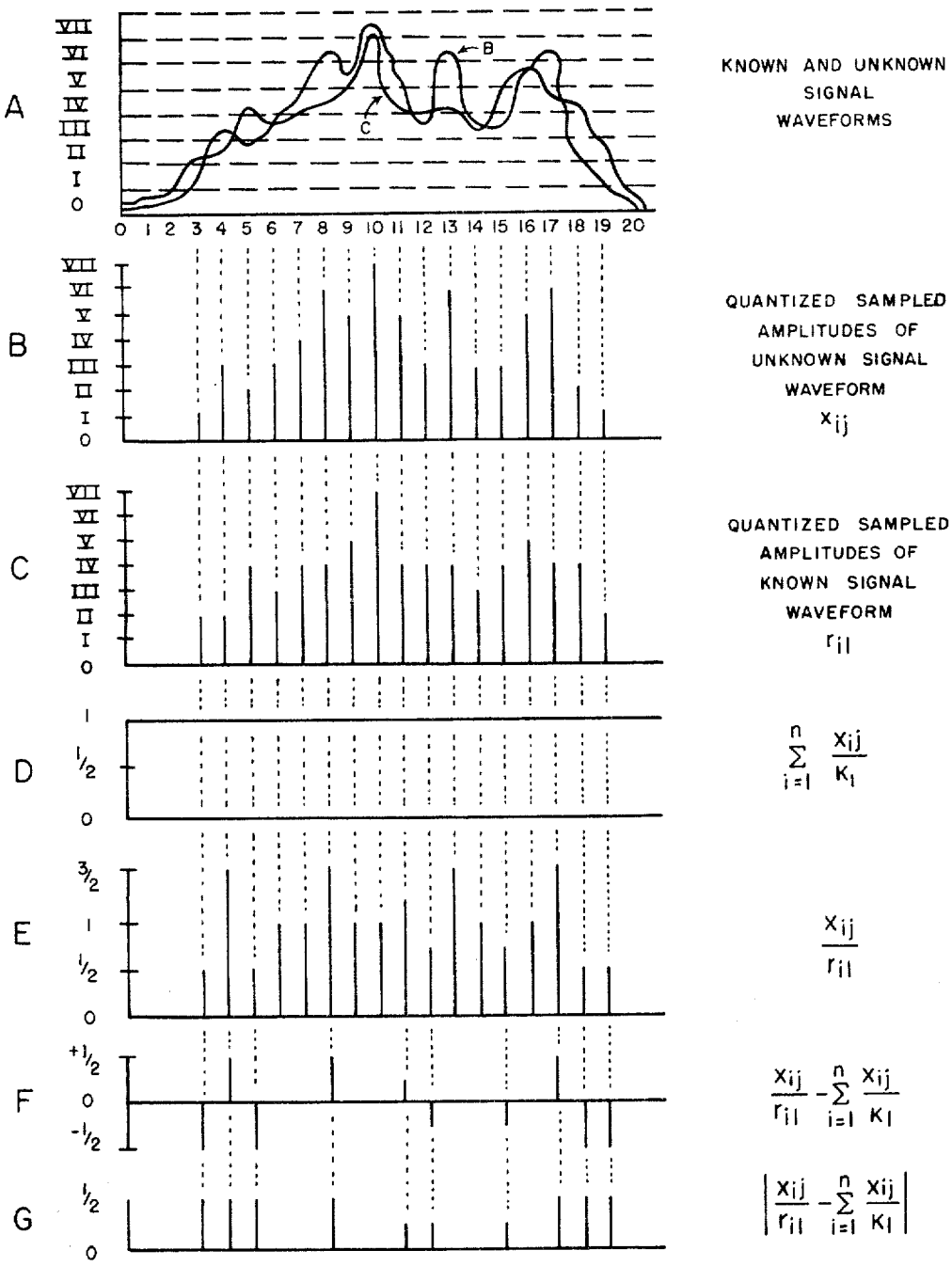
FIG. 1 is a graphical representation of waveforms pertinent to system operation.

With reference now to FIG. 1, there is illustrated a graphical representation of signal waveforms pertinent to understanding the operation of the novel system. From the discussion of the specific example illustrated therein, the applicability of the recognition function to the recognition of complex signal waveforms will become evident.

In FIG. 1A there are illustrated two signal waveforms, the amplitude of each being sampled at the twenty indicated points. The horizontal broken lines divide the signal amplitude region into eight quantum levels, indicated by Roman numerals arranged in the order of increasing amplitude, each quantum level being characterized by a three digit binary number. While the novel principles herein disclosed are equally applicable to signal waveform recognition systems wherein the signal amplitude is not quantized and encoded binarily, the encoding technique leads to apparatus which embodies the invention in a form providing reliable operation with a relatively small number of components. The choice of the number of quantum levels and sampled points need not be limited to eight and twenty respectively, these numbers being chosen as convenient for this example.

In FIG. 1B the sampled points of waveform B in FIG. 1A are illustrated in graphical form according to the binary quantum level in which the amplitude of each sampled point falls: for example, if the amplitude at a sampled point falls within the region of FIG. 1A designated at IV, a single vertical line appears in FIG. 1B four units high directly below that point. Preliminarily, waveform B of FIG. 1A may represent both the unknown signal waveform and the known signal waveform selected for comparison therewith. Then, the amplitude of the vertical lines illustrated in FIG. 1B represent both $x_{ij}$ and $r_{ii}$ of the aforementioned function, that is, $j=1$. In providing apparatus for performing the aforementioned summation, it is convenient to neglect summing all terms in which $r_{ii}$ is zero. Then the sum will never be infinite as long as each $x_i$ is finite. This does not detract from the ability of the apparatus to recognize complex waveforms, because a waveform to be recognized may be biased so that the only zero points are at the beginning and end thereof, as illustrated in FIG. 1A. Each term, $$\frac{x_{ij}}{r_{ii}}$$

to be summed, will then be of unit height when $j=1$. The constant $K_1$ is chosen to constrain $$\frac{\sum_{i=1}^{n} x_{ij}}{k_1}$$

to be unity when the unknown signal waveform is substantially the same as that of the known waveform compared therewith. For example, in the present illustration, $\Sigma x_{ij}$ is 60, the sum of the amplitudes of all twenty samples of FIG. 1B; hence, $K_1$ is equal to 60. Since each term, $$\frac{x_{ij}}{r_{ii}}$$

to be summed, is of unit height when $j=1$, subtraction of $$\frac{\sum x_{ij}}{k_1}$$

also unity, provides a resulting function which is identically equal to zero, identifying the unknown signal waveform as that of the known signal waveform then compared therewith.

To illustrate a situation where the unknown waveform and the known waveform compared therewith are dissimilar; that is, $j\neq 1$, known waveform C is illustrated in FIG. 1A, together with the result of sampling known waveform C in 20 points which correspond to the sampled points of unknown waveform B. The sampled amplitudes of known waveform C are illustrated in FIG. 1C, the amplitude of each vertical line therein representing an $r_{ii}$. The known waveform C has been chosen to have the same average value as unknown waveform B, in order to illustrate the facility with which the recognition function yields a substantial indication of the dissimilarity between two waveforms, even though the dfference therebetween is small. Since waveforms B and C have the same average value, the constant $k_1$ for known waveform C is 60, the same as for waveform B, and then the term $$\sum_{i=1}^{n} \frac{x_{ij}}{k_1}$$

is 1, as illustrated in FIG. 1D.

In FIG. 1E there is illustrated the ratio of the amplitudes of each sampled point of waveform B to each corresponding sampled point of waveform C; for example, note that the ratio of the fourth sampled points of the waveforms is 3/2. In accordance with the recognition function, the unit amplitude $$\sum_{i=1}^{n} \frac{x_{ij}}{k_1}$$

of FIG. 1D is subtracted at each sampled point from the amplitude of each ratio term of FIG. 1E. The result of this differencing operation is illustrated in FIG. 1F. Complying with the procedure indicated by the recognition function of summing the absolute magnitude of each term therein, all the negative amplitudes of FIG. 1F are inverted, and the final summation completed on the waveform of FIG. 1G. Note that summing the sampled amplitudes of FIG. 1F would yield a sum $1\frac{3}{4}-2\frac{1}{2}=-\frac{3}{4}$, while summing the sampled amplitudes of FIG. 1G, wherein the absolute value of the sampled amplitudes are summed, yields a total of 4¼. Thus, while the difference alone of the two terms of the function would still yield a value other than zero when the two compared waveforms are different, it is seen that the amplitude of the difference value is markedly increased by taking the absolute value of the difference of the two terms of the function, as described and illustrated above. Moreover, the case where the two terms are not each identically zero but the sum is, is excluded.

Having disclosed the method by which a complex signal waveform is identified in accordance with the recognition function, it is appropriate to describe apparatus which embodies the principles discussed above to provide an output signal which identifies a relatively complex unknown signal waveform. The unknown signal waveform may be characteristic of a printed symbol derived by unidirectionally scanning the printed symbol with a slit scanner, relative motion being imparted between an illuminated slit and the symbol.

A light sensitive device, such as a photocell, provides a signal of amplitude which is proportional to the fraction of slit area then covered by dark portions of said symbol. The slit may be of any desired shape and angularly oriented in any direction with respect to said relative motion. The resultant output signal from the light sensitive device is then a signal waveform characteristic of the scanned symbol. Typical waveforms derived thereby are illustrated in FIG. 1A.

Figure 2:
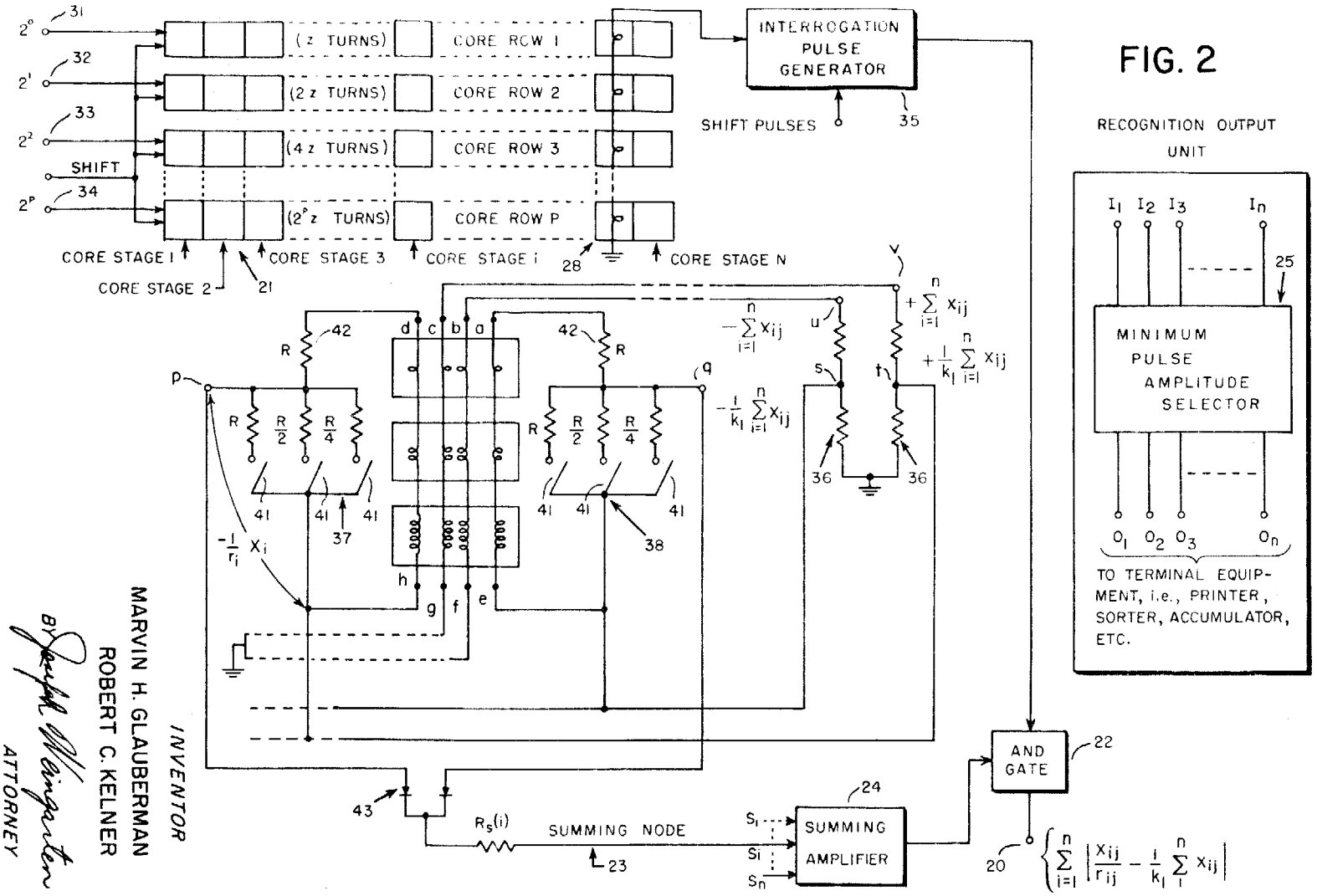
FIG. 2 is a combined block-schematic diagram which illustrates a preferred embodiment of the invention.

Referring to FIG. 2, there is illustrated a combined block schematic diagram of apparatus which provides recognition of an unknown signal waveform. A general description of the function of each portion of the apparatus will facilitate understanding the succeeding detailed description of each element thereof.

The sampled amplitudes of FIG. 1B, encoded in binary form, are sequentially inserted into the shift register storage system 21. When all the sampled amplitudes have been inserted therein, an interrogation pulse is generated by generator 35 and applied to one input of gate 22, there being a gate 22 for each expected waveform to be recognized. Energizing the other input of each gate 22 is a summing amplifier 24. When the shift pulse substantially coincident with the interrogation pulse is generated, an output pulse, which is indicative of the difference between the unknown signal waveform and the known signal waveform compared therewith, is generated by summing amplifier 24. This pulse is gated through by gate 22 for comparison in minimum pulse amplitude selector 25, selector 25 having one input terminal and one output terminal for each expected signal waveform; however, only the output terminal associated with the input terminal having the smallest pulse amplitude is energized, thereby recognizing the unknown signal waveform as that of the signal waveform associated with the energized output terminal.

The functioning of the apparatus to generate the foregoing recognition pulse will become apparent from the detailed description which follows. Considering first shift register storage system 21, it is seen that each row of magnetic cores diagrammatically illustrated comprises a conventional magnetic core shift register. Note that each vertical column of cores comprises one core storage, there being preferably at least as many core stages, N, as there are samples of the signal waveform. In the present example, a convenient number of core stages is 20, since 20 samples of the complex signal waveform of FIG. 1A were taken; however, a greater or lesser number of stages may be employed without departing from the principles disclosed herein. It is also to be noted that there are at least as many rows, P, as there are binary digits in the number of quantum levels selected to designate amplitudes of the sampled points of the signal waveforms. Hence, in accordance with the choice of eight quantum levels selected in the example of FIG. 1, three rows are sufficient because eight quantum levels may be uniquely represented by three binary digits. A binarily encoded quantum level is inserted into storage by energizing one or more of input terminals 31, 32, and 33, associated with digit places of a binary number utilizing the first, second and third binary digits respectively. For example, if quantum level 7 were to be inserted into the shift register storage system, terminals 31, 32 and 33 would simultaneously be energized with a pulse. Shortly thereafter, a shift pulse is applied on terminal 34 which is effective in shifting the stored data in each core into the core immediately adjacent thereto on the right. Thus, the binarily encoded amplitude of a sampled point of the unknown signal waveform is stored in each core stage, each of said encoded amplitudes being advanced until the first of twenty samples (Sample No. 1 of FIG. 1A) resides in the next to last core stage 28. The shift pulse following the insertion of the first non-zero sampled point (Sample No. 3 of FIG. 1B) into core stage 28 will be effective in providing an output pulse therefrom for application to interrogation pulse generator 35, which is energized simultaneously by a shift pulse to furnish an interrogation pulse to each gate 22, signifying that all the sampled amplitude points, $x_{ij}$, are in a position in shift register storage system 21 where they may be compared with corresponding points, $r_{ij}$, of known signal waveforms in response to the next shift pulse. Details of generator 35 are discussed below, its operation not being essential to understanding the system currently described.

Shift register storage system 21 is arranged in a novel manner which provides digital-to-analog conversion. Not only will the utility of this system for providing such conversion in the present system become apparent from the discussion which follows, but also its applicability to other systems requiring digital-to-analog conversion. In FIG. 2, cores in the first three rows of a typical core stage, called the $i^{th}$, and associated components are illustrated in detail to demonstrate the novel features in a preferred embodiment for generating the recognition function. In the illustrated stage each core has four output windings thereon. It is especially to be noted that the windings in core row 2 have twice as many turns as adjacent serially connected windings in core row 1, z being the number of turns in core row 1, and windings in core row 3 have twice as many windings as in core row 2. In general, core row P has substantially twice as many turns as core row P–1. Correspondingly, an output pulse from a core winding in row P, in response to a shift in the core magnetic state is twice the output pulse from a core winding in row P–1. This arrangement of turns ratios provides the digital-to-analog conversion, for if each core resides in a magnetic state such that the next shift pulse will produce an output pulse across a winding, then the amplitude of the output pulse across a winding of core row 2 will be substantially twice that across a serially-connected winding of core row 1 and ½ that of a similar winding of a core in row 3. For example, assume that the output pulse across the winding of a core in row 1 is one volt; then the output pulse across a serially-connected winding of the core in row 2 will be two volts, and across the adjacent winding of the core in row 3, four volts. The resultant voltage of a pulse across the serially-connected windings under such a condition, then would be seven volts. Note that the binary number 111 corresponds to the decimal number 7; hence, this winding arrangement is effective in converting the binary encoded signal amplitude to its analogous quantity.

A feature of employing a shift register storage system in processing the signal waveforms resides in the ability of shift pulses to be synchronized with the rate at which the signal waveform is introduced into storage, thereby rendering the apparatus relatively insensitive to fluctuations in the aforesaid rate.

The amplitude of the voltage pulse across each serially-connected group of windings is analogous to the sampled amplitude, $x_{ij}$ which was stored in that stage. In order to derive the electrical analog of $$\sum_{i=1}^{n} x_{ij}$$

groups or serially-connected windings in each core stage, like those between terminals c and g are serially connected, thereby providing the analog of $$\sum_{i=1}^{n} x_{ij}$$

at terminal v.

A convenient method for providing the absolute value of the summation in the recognition function utilizes full wave rectification of a signal characteristic of the function, said signal, when graphically represented as a function of time, lying above and below the time axis. To provide such rectification, not only is a signal analogous to $$\sum_{i=1}^{n} x_{ij}$$

provided, but also a signal which is the analog of $$\sum_{i=1}^{n} x_{ij}$$

Note that in the novel digital-to-analog conversion system herein disclosed, the desired signal is readily attained by connecting in tandem serially-connected groups of windings in each core stage, like the windings between terminals b and f, in the manner used to derive the analog of $$\sum_{i=1}^{n} x_{ij}$$

but connected to provide an output signal opposite in polarity thereto. In this manner, the analog signal of $-\Sigma x_{ij}$ is provided at terminal u.

For each expected known signal waveform to be compared with the unknown waveform, there are a pair of identical attentuators or voltage dividers 36, preferably resistive as shown. The taps at terminals s and t are selected in accordance with the average value of the known waveform identified with the pair of dividers, to provide a signal amplitude analogous to $$-\frac{1}{k_1}\sum_{i=1}^{r} x_{ij}$$

and $$\frac{1}{k}\sum_{i=1}^{n} x_{ij}$$

respectively on the aforesaid taps.

The signals on terminals d and a, respectively analogous to $x_{ij}$ and $-x_{ij}$ are attentuated by identical voltage dividers, respectively 37 and 38, arranged to provide an output signal $$1/r_{ij}$$

times the signal input thereto. For each expected known signal waveform, there is a pair of voltage dividers 37 and 38 together with associated serially-connected windings as shown in the typical core stage. However, for clarity, the illustrated core stage is arranged to recognize only one unknown signal waveform, it being understood that addition of more of the aforementioned components adapts the apparatus for recognition of a larger plurality of signal waveforms.

A preferred arrangement of resistors for dividers 37 and 38 is illustrated in FIG. 2 which provides rapid selection of $$1/r_{ij}$$

by operating the switches 41 to provide in series with the resistor 42 of value R, various parallel combinations of the resistors of values R, R/2 and R/4. Across said parallel combinations of dividers 37 and 38 the analog signals $$\frac{-x_{ij}}{r_{ij}} \text{ and } \frac{+x_{ij}}{r_{ij}}$$

respectively are provided, $r_{ij}$ being an integer from 1 to 7, according to the selected parallel combination. For example, with all switches open $r_{ij}=1$ and with all switches closed $r_{ij}=7$.

Note that terminals h and e are respectively connected to terminals t and s; therefore, the signals appearing on terminals p and q are the respective sums of the signal across said parallel combinations and the signal derived from a tapped divider 36. On terminal p, the resulting analog signal is $$\frac{-x_{ij}}{r_{ij}} + \frac{\sum_{i=1}^{n} x_{ij}}{k_1}$$

on terminal q, $$\frac{x_{ij}}{r_{ij}} - \sum_{i=1}^{n} \frac{x_{ij}}{k_1}$$

The analog signals on terminals p and q energize full wave rectifier 43, comprised of the two diodes arranged as shown in series with a resistor $R_s$ for selectively energizing summing node 23 with only the positive signals appearing on terminals p and q. There is a full-wave rectifying circuit 43 for each core stage, each circuit 43 being connected to a summing node 23.

Summing amplifier 24 combines the pulse on each summing node 23 to provide as an output at the time an interrogation pulse is generated, a matching pulse of amplitude analogous to $$\sum_{i=1}^{n} \left| \frac{x_{ij}}{r_{ij}} - \frac{x_{ij}}{k_1} \right|$$

and characteristic of the degree of match between the unknown signal waveform and the known waveform compared therewith. Application of the output matching pulse from summing amplifier 24 to one input of gate 22 coincidentally with the other input thereto being energized by an interrogation pulse from interrogation pulse generator 35, provides said matching pulse on terminal 20. Associated with each expected signal waveform to be recognized is a terminal 20 which is connected to an appropriate input terminal of the minimum pulse amplitude selector 25, selector 25 providing an output pulse on the output terminal which corresponds to the input terminal energized with the smallest amplitude matching pulse.

Note that this arrangement provides recognition of an unknown signal as that one of a plurality of known signal waveforms which it most closely resembles; hence, recognition is obtained despite slight deviations, possibly caused by noise, in the unknown signal waveform from its usual shape. Alternatively, recognition may be obtained by coupling terminal 20 to amplitude sensitive apparatus which provides an output when said matching pulse amplitude is less than a predetermined value.

Figure 3:
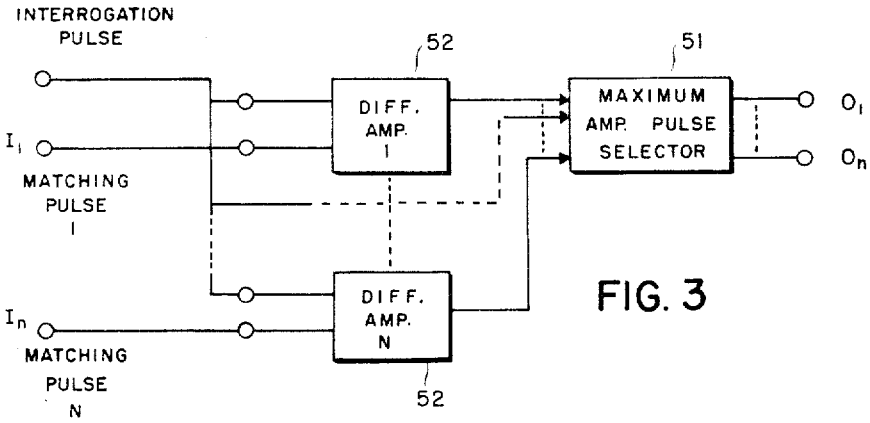
FIG. 3 is a block diagram of a minimum pulse amplitude detector.

Illustrated in FIG. 3 is one form of minimum pulse amplitude selector 25 which comprises a differential amplifier energizing a novel maximum pulse amplitude selector 51 of the type described in the co-pending application of M. A. Meyer, Serial No. 311,885, entitled Channel Selector. FIG. 1 of the aforesaid application shows n input channels each of which may be energized by a pulse, but provides an output signal only on that output terminal, $O_1 \ldots O_n$, associated with the input channel energized by the pulse with the largest amplitude.

Associated with each output terminal 20 is a differential amplifier 52 with one input energized by the matching pulse, the other input being energized simultaneously by a pulse, which may be the interrogation pulse, of the same polarity as, but of larger amplitude than, said matching pulse. The output of differential amplifier 52 is than a modified matching pulse having an amplitude which is larger when the *input* matching pulse is small, and small when said matching pulse is large. The modified matching pulse having the largest amplitude is readily sensed by maximum pulse amplitude selector 51 to provide an identification signal on the appropriate output terminal, $O_1 \ldots O_n$ as described in the aforementioned co-pending application. The identification pulse may be used to energize terminal equipment, such as a printer, which prints a symbol associated with the recognized signal waveform.

Figure 4:
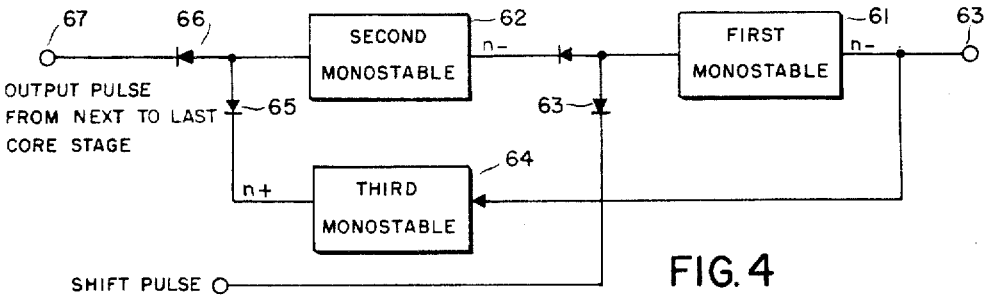
FIG. 4 is a block diagram of one form of an interrogation pulse generator.

The interrogation pulse generator 35 will now be described in detail. Referring to FIG. 4, there is illustrated a block diagram of an embodiment thereof which comprises a first monostable multivibrator 61 which provides an interrogation pulse on terminal 63 in response to simultaneous energization by a shift pulse and gating pulse from a second monostable multivibrator 62. The interrogation pulse triggers a third monostable multivibrator 64 which generates an inhibiting pulse coupled through diode 65 so that monostable 62 generates a gating pulse in response to only the first output pulse from the next to last core stage 28 (FIG. 2) applied through diode 66.

Figure 5:
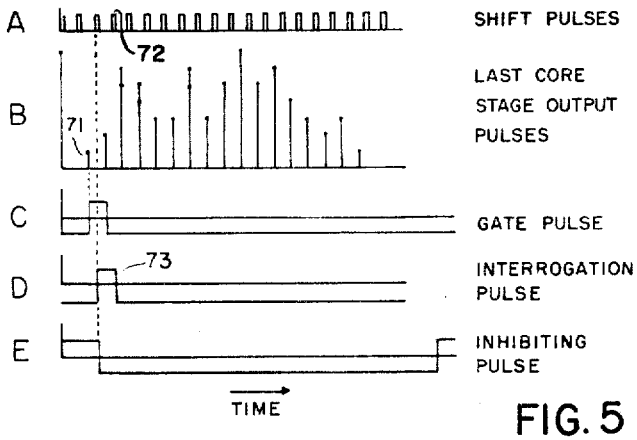
FIG. 5 is a graphical presentation of signal waveforms, plotted to a common time scale, which facilitates understanding the operation of the apparatus of FIG. 4.

The operation of interrogation pulse generator 45 (FIG. 2) will be better understood with reference to FIG. 5 which illustrates graphically pertinent signal waveforms as a function of time. FIG. 5A shows the shift pulses which are applied to terminal 67 of monostable 61. FIG. 5B illustrates a typical signal output from the next to last core stage 28 of FIG. 2. In particular, the waveform illustrated is that which would be derived as the quantized waveform of FIG. 1B moved through core stage 28. The first pulse 71, applied through diode 66, triggers monostable 62, initiating the gate pulse illustrated in FIG. 5C, which has a duration slightly greater than the time interval between shift pulses. The gate pulse, applied to monostable 61, together with the next shift pulse 72, triggers monostable 61, providing an output terminal 63, the interrogation pulse 73 (FIG. 5D). The duration of the interorgation pulse is preferably just long enough to allow gate 22 to pass the selected matching pulse. The time interval between shift pulses is satisfactory for this duration. The symbol n− indicates that the stable state of the monostable whose output is so designated is such that said output is negative.

Interrogation pulse 73 is applied to gate 22 (FIG. 2) as described above, and utilized to trigger the third monostable 64, thereby initiating the inhibiting pulse illustrated in FIG. 5E, which is applied to monostable 62 through diode 65, rendering monostable 62 insensitive to the core stage 28 output pulses for the duration of the inhibiting pulse. The inhibiting pulse duration is sufficient to maintain monostable 62 insensitive to triggering while the coded sampled amplitudes of an unknown signal waveform pass through the last core stage. For example, when the unknown signal waveform is sampled at twenty points, the inhibiting pulse duration is of the order of twenty times the interval between shift pulses. Thus, only one interrogation pulse is generated for each unknown signal waveform examined. The symbol n+ indicates that the designated output is normally at a relatively high potential; hence, diode 65 is open and monostable 62 will respond to an input trigger pulse.

Referring to FIG. 6, there is illustarted a schematic circuit diagram of a core stage suitable for providing an output signal proportional to the value of a binary number stored therein. As in a conventional magnetic core shift register, each binary bit is stored in a core 81 having a number of windings thereon. An input winding 82 receives information signals. A transfer winding 83 delivers an output signal through suitable delay means to the input winding 82 of the core in the same row in the following stage when the core is reset in response to shift pulses. A shift winding 84 is connected in series with all other shift windings for receiving the shift pulses.

Additionally, there is an output winding 85 having a number of turns as indicated related to the significance of the binary digit stored in a respective core. When the output windings 85 of a stage are connected in series as shown, the voltage developed between terminal 86 and terminal 87 has an amplitude proportional to the magnitude of the binary number stored in the stage and delivered in response to the application of a shift pulse to the serially-connected shift windings 84. As indicated above, in the representative embodiment each core has four output windings 85; however, only one is shown in FIG. 6 for each core in order to better illustrate the principle of operation for obtaining digital-to-analog conversion.

In a conventional mode of operation, the binary bit One is stored by applying a signal pulse to the input winding to set the core. The binary bit Zero is stored by allowing the core to remain in the reset state. The next shift pulse resets a core then in the set state to provide a pulse across the transfer and output windings thereof. If the core is already in the reset state, pulses are not provided across the transfer and output windings. As a result, a flux is established through only those output windings on cores storing the binary digit One to provide voltage pulses having an amplitude corresponding to the significance of the digit stored in that core. The sum of the voltages appearing across all the output windings in a stage obtained by connecting the windings in series is then characteristic of the value of the digital number stored therein.

While the apparatus described herein is especially suitable for the recognition of waveforms characteristics of printed symbols, there exist many other uses of portions thereof. For example, the novel shift reigster may be utilized for evaluating the definite integral of an aperiodic function. Note that the signal analogous to $$\sum_{i=1}^{n} x_{ij}$$

appears at terminal v in FIG. 2; hence, a pulse on terminal v derived in synchronism with the interrogation pulse, will be characteristic of the integral of the unknown signal waveform in FIG. 1A.

The novel shift register system is especially suitable for the rapid evaluation of the correlation function:

$$\phi_{in}(\tau) = \lim_{T\to\infty} \frac{1}{2T} \int_{-T}^{T} f_1(t) f_n(t-\tau)\,dt$$

n being one of auto-correlation, two for cross-correlation. For quantized signals and with $f_1(t)=0$ outside the range, $-T<t<T$, the integral may be written as:

$$\phi_{in}(\tau) = \frac{1}{2T} \sum_{i=\frac{-T}{\Delta T}}^{\frac{T}{\Delta T}} f_1(t_i) f_n(t_i-\tau)$$

where $\Delta T$ is the time interval between samples. The time-amplitude distribution of $f_1(t_i)$ may be set into the shift register system of FIG. 2 by switching in appropriate parallel resistance combinations in divider 37, the $f_1(t_i)$ for each $t_i$; corresponding to $$1/r_1$$

Each quantized signal amplitude analogous to $f_n(t_i-\tau)$ is then sequentially inserted into shift register storage and the correlation output pulses which are derived across terminals p and h in each core stage in response to a shift pulse, are summed and stored by suitable means, such means being a cathode ray tube, or an inked stylus in contact with a moving paper, the deflection of the pen perpendicular to the motion of the paper being proportional to the summed pulse amplitudes. The foregoing procedure continues as long as any portion of the signal analogous to $f_n(t_i-\tau)$ remains in a core stage. The means for storing the summed pulses then contains the correlation function. For instance, if the means included the aforementioned moving paper, a graphical representation of the correlation function would appear thereon.

Prior art correlators consume a substantial period of time to derive a correlation function because they perform the indicated integration of the product for only one value of $\tau$ on each run of the waveforms through the machine. The novel system disclosed herein provides the complete correlation function as the signal analogous to $f_n(t_i-\tau)$ passes through the shift register system but once, thereby providing said function substantially instantaneously.

When $f_1(t)$ is the impulse response of a linear system and $f_n(t-\tau)$ is an aperiodic input signal applied thereto, the correlation function derived in the above manner is the response of said linear system to said aperiodic input signal. Hence, the apparatus is suitable for the rapid evaluation of the convolution or superposition integral.

Another use of the apparatus is to evaluate weighted integrals such as the various moments of the waveform. For example, in evaluating the integral of a function it may be desired to weight certain regions of the function less than others. This is readily accomplished by attenuating the output signals from each core stage in accordance with the desired weight to be given the associated portion of the waveform.

Other uses will be suggested to those skilled in the art, who may make numerous modifications of the apparatus described herein in a specific form without departing from the disclosed inventive concepts. Consequently, the invention is to be construed as limited only by the spirit and scope of the appended claims.

What is claimed is:

1. Electrical apparatus for determining the degree of match between an unknown signal waveform and a known signal waveform comprising means for sampling said unknown signal in n regions to derive for each region a signal designated $x_i$ which is indicative of a predetermined characteristic of said unknown signal in region i, means for sampling said known signal in a corresponding plurality of regions to derive for each region a signal designated, $r_i$ which is indicative of said predetermined characteristic of said known signal in said region i, means for deriving for each known signal waveform a signal designated m which is related to the average value of said predetermined characteristic of said known signal waveforms, and a combining circuit for relating the aforesaid signals in accordance with the summation $$\sum_{i=1}^{n}\left|\frac{mx_i}{r_i}-\frac{\sum_{i=1}^{n}x_i}{n}\right|$$

to providing an output matching signal.

2. Electrical apparatus for determining the degree of match between an unknown signal waveform and a known signal waveform comprising, means for sampling said unknown signal in a plurality of regions to derive for each region a signal designated $x_i$ which is indicative of a predetermined characteristic of said unknown signal in region i, means for binarily encoding each of said signals designated $x_i$, storage means for retaining each of said binarily encoded signals, means for converting each stored binarily encoded signal into a form analogous to the related signal designated $x_i$ to derive for each sampled region an analog signal, means for attenuating each analog signal by a factor designated $r_i$ which is indictive of said predetermined characteristic of said known signal in said region i to derive a plurality of attenuated analog signals each designated $$\frac{x_i}{r_i}$$

means for cumulatively combining said analog signals and attenuating same by a factor designated k which is related to the product of the average value of said predetermined characteristic of said known signal waveform with the number of said plurality of regions to derive a sum signal designated $$\frac{\sum_{i=1}^{n}x_i}{k}$$

means for differentially combining each of said attenuated analog signals with said sum signal to derive a sampled point signal for each of said regions, and means for combining the magnitudes of said sampled point signals to derive a matching signal in accordance with the summation $$\sum_{i=1}^{n}\left|\frac{x_i}{r_i}-\frac{\sum_{i=1}^{n}x_i}{k}\right|$$

3. Electrical apparatus for identifying an unknown signal waveform as one of a plurality of known signal waveforms comprising, means for sampling said unknown signal in n regions to derive for each region a signal designated $x_i$ which is indicative of a predetermined characteristic of said unknown signal in region i, means for sampling each known signal in a corresponding plurality of regions to derive for each region a signal designated $r_i$, which is indicative of said predetermined characteristic of the known signal in said region i, means for deriving for each known signal waveform a signal designated m which is related to the average value of said predetermined characteristic of its respective known signal waveform, means for combining the aforesaid signals in accordance with the summation $$\sum_{i=1}^{n}\left|\frac{mx_i}{r_i}-\frac{\sum_{i=1}^{n}x_i}{n}\right|$$

to derive a matching signal for each known signal waveform, and means for identifying said unknown waveform as the known waveform associated with the recognition signal having a magnitude which is less than a predetermined value.

4. Electrical apparatus for identifying an unknown signal waveform as one of a plurality of known signal waveforms comprising, means for sampling said unknown signal in n regions to derive for each region a signal designated $x_i$ which is indicative of a predetermined characteristic of said unknown signal in region i, means for sampling each known signal in a corresponding plurality of regions to derive for each region a signal designated $r_i$, which is indicative of said predetermined characteristic of the known signal in region i, means for deriving for each known signal waveworm a signal designated m which is related to the average value of said predetermined characteristic of its respective known signal waveform, means for combining the aforesaid signals in accordance with the summation $$\sum_{i=1}^{n}\left|\frac{mx_i}{r_i}-\frac{\sum_{i=1}^{n}x_i}{n}\right|$$

to derive a recognition signal for each known signal waveform, and circuit means for identifying said unknown waveform as the known waveform associated with the recognition signal having the smallest magnitude.

5. In a system for recognizing an unknown signal waveform which is sampled for a predetermined characteristic at discrete points as one of a plurality of known signal waveforms, apparatus for each of said known signals comprising, means for determining the ratio of the value of said predetermined characteristics at a discrete point to the value of the same predetermined characteristic of the known signal waveform being compared therewith at a corresponding point to derive a first ratio signal, means for summing the value of said predetermined characteristic of said unknown signal waveform at all of said discrete points and dividing same by a constant which is related to the known signal waveform being compared with said unknown signal waveform to derive a constant ratio signal, means for differentially combining said constant ratio signal with each of said first ratio signals, means for summing the absolute magnitude of said differentially combined ratio signals to derive a matching signal characteristic of the degree of match between said unkonwn signal and the known signal compared therewith, and means for recognizing said unknown signal as the known signal compared therewith which comparison yields the smallest value matching signal.

6. Electrical apparatus for identifying an unknown signal waveform by comparison with known signal waveforms which includes for a comparison with each known signal waveform, means for sampling the amplitude of said unknown waveform a preset number of times to derive a plurality of sample signals, means for combining said sample signals to derive a sum signal characteristic of the combined amplitude thereof, means for attenuating said sum signal by a constant related to the product of the average value of said known signal with said preset number, means for attenuating each sampled signal by an amount related to the amplitude of said known signal waveform at a point corresponding to the point in time whereat said unknown signal is sampled to derive a sampled quotient signal, means for differentially combining the attenuated sum signal and each sampled quotient signal to derive a weighting signal for each sampled point, means for combining said weighting signals to derive a weighted sum signal, and means for identifying said unknown signal as corresponding to that known signal compared therewith which results in said weighted sum signal being less than the weighted sum signal derived from comparisons with the other known signal waveforms.

7. Electrical apparatus for identifying an unknown signal waveform by comparison with known signal waveforms which includes for a comparison with each of said known signal waveforms means for sampling the amplitude of said unknown signal waveform at a preset number of points and deriving a plurality of sampled signals each characteristic of the associated sampled amplitude of the known signal waveform compared therewith, means for deriving from each sampled signal a sampled quotient signal characteristic of the associated sampled amplitude divided by the amplitude of a known signal waveform compared therewith sampled at a corresponding point in time, means for combining said sampled signals to derive a sum signal, means for deriving from said sum signal a constant quotient signal characteristic of the combined amplitude of said sampled signals divided by the product of said preset number and the average value of the amplitude of said known signal waveform being compared, means for differentially combining each sampled quotient signal with said constant quotient signal to derive a weighting signal for each of said points, means for combining the absolute magnitude of said weighting signals, to derive at weighted sum signal for each known signal waveform being compared, and means for comparing said weighted sum signals to select the known signal waveform associated with the smallest weighted sum signal as said unknown signal waveform.

8. Electrical apparatus for identifying an unknown signal waveform by comparison with known signal waveforms which includes for a comparison with each of said known signal waveforms, means for sampling the amplitude of said unknown waveform at a preset number of points to derive a plurality of sampled signals, means for combining said sampled signals to derive a sum signal characteristic of the combined amplitude thereof, means for dividing said sum signal by said preset number to derive a constant quotient signal, means for averaging the known signal then being compared with said unknown signal waveform to derive an average signal characteristic of the average amplitude of said known signal, means for dividing each sampled signal by a known sampled signal derived from sampling a known signal waveform at a point corresponding to the point in time whereat said unknown signal is sampled to derive a sampled quotient signal, means for multiplying said sampled quotient signal by said average signal to derive a sampled point signal, means for differentially combining said constant quotient signal from each sampled point signal to derive a weighting signal for each sampled point, means for combining said weighting signals to derive a weighting signal for each sampled point, means for combining said weighting signals to derive a weighted sum signal, and means for identifying said unknown signal as corresponding to that known signal compared therewith which results in a weighted sum signal being less than a predetermined value.

9. Apparatus for deriving the definite integral of an aperiodic function whose amplitude at discrete points has been encoded into binary form comprising, a pluarlity of core stages, each core stage comprising a magnetic core for each binary digit utilized to encode the largest amplitude of said function, an input winding for each of said cores which is energized by an input pulse when the associated binary digit is non-zero at the time an encoded signal amplitude is to be inserted into the respective core stage, a core source of shift pulses, means for energizing each core with said shift pulses to change the magnetic state thereof when a non-zero binary digit is stored therein, for each core an output winding having sufficient turns so that an output pulse derived therefrom in response to a change in the magnetic state of its respective core is of an amplitude twice that of the pulse across the output winding of the core associated with the adjacent binary digit of lesser significance and one-half that of the pulse derived across the output winding of the core associated with the adjacent binary digit of greater significance, said output windings being serially connected to the output windings of cores associated with adjacent binary digits, there being at least as many of said stages as there are sampled points of said aperiodic function, means for energizing an input winding of a core with the pulse from the output winding of the core associated with the same binary digit in the preceding core stage, thereby effectively transferring the stored binary number in each core stage to the following core stage in response to each shift pulse, and means for combining the output pulses across said output windings after a shift pulse is generated when substantially all said binarily encoded amplitudes of said aperiodic function are stored in said core stages.

10. Apparatus as in claim 9 and including, an interrogation pulse generator which provides an interrogation pulse in response to an output pulse being generated across an output winding of a selected core stage signifying the presence of substantially all said binarily encoded amplitudes in said plurality of core stages, and said means for combining output pulses comprises means for serially connecting the output windings of all of said cores, and a gate energized simultaneously by said interrogation pulse and the output pulse derived across said serially connected output windings to provide a gated output pulse having an amplitude which is characteristic of the integral of said aperiodic function.

11. Apparatus for deriving an output signal characteristic of the correlation function of first and second functions comprising, a plurality of magnetic core shift registers each having the same number of cores, said shift registers being arranged in a manner whereby corresponding cores in each register comprise a stage, means for encoding amplitudes sampled at discrete points of said first function in binary form, the largest sampled amplitude being encoded by p digit binary number, at least an output winding for each core, each of said output windings providing an output pulse in response to a change of magnetic state in its respective core which is respectively of amplitude twice and one-half that derived across the output windings of adjacent cores associated with a digit of less and greater significance respectively, the output windings of each core stage being serially connected to cumulatively combine the output pulses for each stage, an attenuation network for providing an attenuated pulse by attenuating the combined output pulses, the degree of attenuation being related to the binarily encoded amplitude at a point of said second function, means for cumulatively combining the attenuated pulses from each core stage and storing the combined attenuated pulses, and means for inserting the binarily encoded sampled amplitudes of said first function sequentially into said shift register storage system, the stored combined attenuated pulses derived during the passage of the encoded amplitudes of said first function through said shift register storage system being characteristic of the correlation function of said first and second functions.

12. Apparatus for recognizing an unknown signal waveform comprising, means for sequentially sampling said unknown signal waveform and deriving therefrom in binary form a plurality of sampled signals characteristic of the amplitude of the sampled portions, for each sampled signal a magnetic core stage wherein a binary number characteristic of the amplitude of the associated sample is stored, each magnetic core stage comprising, a core for each binary digit in the binary number to be stored, each core having a plurality of output windings each serially connected to similar windings on adjacent cores, the ratio of turns on adjacent serially connected windings being substantially two, the greater number of turns being on the core associated with the binary digit of greater significance, there being a pair of said plurality of windings for each known signal waveform to be compared with said unknown waveform, associated with each of said pair of windings, voltage dividing means for attenuating the output signal across said pair of windings by a factor characteristic of the amplitude of the associated known signal waveform at a point, for each stage a common pair of said plurality of windings each being serially connected to a respective winding of a corresponding pair in adjacent stages, in the first core stage said common pair being connected to a common terminal point, and at the last stage each winding of said common pair being connected to one end of separate pairs of serially connected resistors, the other end of said separate pairs being connected to said common terminal, the ratio of resistance values in each of said separate pairs being related to the average value of the amplitude of an associated known signal waveform, the junction of the resistors in each pair being connected to one end of said voltage dividers, for each pair of voltage dividers a rectifying circuit comprising a resistor connected between a summing node and a common terminal point joining the current receptive elements of a pair of diodes, the other element of each diode separately connected to the attenuation point of a respective voltage divider, associated with each known signal waveform a summing amplifier with an input coupled to the summing node associated with the same known signal waveform from each core stage, said summing amplifier providing an output signal characteristic of the cumulative combination of the input signals thereto, an interrogation pulse generator which provides an interrogation pulse in response to the first sampled signal being shifted into said last core stage; a gate for each summing amplifier with one input coupled to the output terminal of its respective summing amplifier and the other input coupled to the output terminal of said interrogation pulse generator, and minimum pulse amplitude selecting apparatus having input terminals separately coupled to the output terminal of each of said gates and an output terminal for each input terminal, said selecting apparatus providing a recognition pulse on only the output terminal associated with the input terminal energized by the pulse of the smallest amplitude.

13. In a system for processing one or more signal waveforms sampled at discrete points for the value of a predetermined characteristic, said value being encoded in binary form, apparatus comprising, a plurality of core stages, each core stage comprising a magnetic core for each binary digit utilized to encode the largest expected value of said predetermined characteristic, an input winding for each of said cores suitable for being energized by an input pulse when the associated binary digit is a first value at the time an encoded sampled value is to be inserted into the respective core stage, for each core an output winding having sufficient turns so that an output pulse derived therefrom in response to a change in the magnetic state of its respective core is of an amplitude respectively twice and one-half that of pulses derived across the output windings of cores associated with adjacent binary digits of lesser and greater significance respectively, said output windings being serially connected to the output windings of cores associated with binary digits of adjacent significance, and coupling means between cores associated with a binary digit of the same significance in adjacent core stages, whereby said binarily encoded value in one stage may be transferred to a following stage concurrently with a pulse of amplitude analogous to said binarily encoded value being derived across said serially connected output windings.

14. In a system for processing a signal waveform which is sampled at a plurality of discrete points and an encoding signal characteristic of the binarily encoded amplitude of said waveform at each discrete point derived, apparatus comprising, a plurality of core stages, each core stage comprising a magnetic core for each binary digit utilized to encode the largest amplitude of said signal waveform, an input winding for each of said cores which is energized by an input pulse when the associated binary digit to be stored is of a first value at the time an encoding signal is to be inserted into the respective core stage, said input pulse being effective to change the magnetic state of the associated core, a source of shift pulses to change the magnetic state of each core having stored therein a binary digit of said first value, for each core at least an input winding, and an output winding having sufficient turns so that an output pulse derived therefrom in response to a change in the magnetic state of its respective core is of an amplitude respectively twice and one-half that of the pulse derived across the output windings of cores associated with adjacent binary digits of lesser and greater significance respectively, said output windings being serially connected to the output windings of cores associated with adjacent binary digits, means for energizing an input winding of a core with a signal pulse from a core associated with a binary digit of the same significance in a preceding stage, said signal pulse being derived in response to a shift pulse, thereby effectively transferring the stored binary number in a core stage to a following stage in response to each shift pulse, and means for combining the output pulses derived across said serially-connected windings during one or more selected time intervals related to said shift pulses.

[15. Apparatus for classifying an unknown signal waveform with respect to a plurality of known signal waveforms comprising, means for deriving a plurality of recognition signals respectively characteristic of the difference between said unknown signal waveform and each of said known signal waveforms, and means for deriving an output signal characteristic of the known waveform associated with the recognition signal indicating the least difference.]

[16. Apparatus for classifying an unknown signal waveform with respect to a plurality of known signal waveforms comprising, means for deriving digital signals characteristic of a multiplicity of points on said known signal waveform, means for processing each of said digital signals with respect to an electrical representation of each of said known waveforms to derive a like plurality of recognition signals, and means for deriving an output signal characteristic of the known waveform associated with the recognition signal indicating least difference.]

*17. Apparatus for classifying an unknown signal waveform with respect to a plurality of known signal waveforms, the apparatus comprising:*

*means for sampling the unknown signal waveform at a plurality of discrete regions to derive a quantized signal for each region;*

*means for sampling each known signal waveform at a corresponding plurality of discrete regions to derive a quantized signal for each region;*

*means for combining the quantized signals from said known and unknown signal waveforms to derive for each known signal waveform a series of signals characteristic of the degree of difference between the known signal waveform and the unknown signal waveform at said plurality of discrete regions; means for combining the signals in each said series to derive*

*for each known signal waveform a recognition signal characteristic of the degree of difference between the known signal waveform and the unknown signal waveform in their entireties;*

*and means for comparing the recognition signals to produce an output signal characteristic of the known signal waveform associated with the recognition signal indicating the least difference.*

References Cited by the Examiner

The following references, cited by the Examiner, are of record in the patented file of this patent or the original patent.

UNITED STATES PATENTS

| | | | |
|---|---|---|---|
| 2,285,296 | 6/1942 | Maul. | |
| 2,294,679 | 9/1942 | Maul. | |
| 2,616,983 | 11/1952 | Zworykin. | |
| 2,673,337 | 3/1954 | Avery. | |
| 2,719,965 | 10/1955 | Person. | |
| 2,738,499 | 3/1956 | Sprick. | |
| 2,784,390 | 3/1957 | Chien. | |
| 2,805,408 | 9/1957 | Hamilton. | |
| 2,817,078 | 12/1957 | Pfeiffer. | |
| 2,828,482 | 3/1958 | Schumann. | |
| 2,836,356 | 5/1958 | Forrest et al. | 324—99 |
| 2,840,707 | 6/1958 | Johnson | 328—151 |
| 2,877,413 | 3/1959 | Muehlner | 324—68 |

MALCOLM A. MORRISON, *Primary Examiner.*

ROBERT C. BAILEY, *Examiner.*

M. A. LERNER, M. SPIVAK, *Assistant Examiners.*